United States Patent [19]

Terada

[11] Patent Number: 4,636,671

[45] Date of Patent: Jan. 13, 1987

[54] MAGNETO GENERATOR FOR INTERNAL COMBUSTION ENGINE

[75] Inventor: Kanechiyo Terada, Kariya, Japan

[73] Assignee: Nippondenso Co., Ltd., Kariya, Japan

[21] Appl. No.: 680,512

[22] Filed: Dec. 11, 1984

[30] Foreign Application Priority Data

Dec. 23, 1983 [JP] Japan .................. 58-248369
Jan. 25, 1984 [JP] Japan .................. 59-12529
Apr. 23, 1984 [JP] Japan .................. 59-82759
Aug. 1, 1984 [JP] Japan .................. 59-163098

[51] Int. Cl.$^4$ .................................. H02K 7/02
[52] U.S. Cl. .................... 310/74; 310/67 R; 310/68 R; 310/153; 310/156; 123/601
[58] Field of Search .............. 310/70 R, 68 R, 70 A, 310/72, 74, 168, 153, 169, 67 R, 156, 170, 208, 45, 179, 180, 185, 187, 259; 322/4, 91, 94; 123/149 R, 601; 74/572

[56] References Cited

U.S. PATENT DOCUMENTS 4,061,121 12/1977 MacLeod ................. 310/70 A
4,157,702 6/1979 Ogasawala et al. ........ 310/70 R
4,418,296 11/1983 Ebentheuer ............. 310/70 R
4,537,174 8/1985 Nagasawa ............... 310/70 R

FOREIGN PATENT DOCUMENTS 49-46163 12/1974 Japan .
55-62179 4/1980 Japan .
24020 10/1981 Japan .

Primary Examiner—R. Skudy
Attorney, Agent, or Firm—Cushman, Darby & Cushman

[57] ABSTRACT

A magneto generator for a motorcycle engine having a flywheel, in which a plurality of magnets are circumferentially arranged at equal intervals, a certain number of adjacent magnets have the same polarity at their inner surfaces, and N- and S-pole alternately appear at the inner surfaces of the remaining magnets. A stator arranged within the flywheel includes one large pole core and a plurality of small pole cores, each of which extends radially outwardly to face to the inner surfaces of the magnets at their T-shaped pole pieces formed at their forward ends. A capacitor charging coil is wound on the large pole core so that a single pair of positive and negative halfwave voltages are generated at the coil to perform a single spark ignition for each revolution of the magneto generator.

15 Claims, 25 Drawing Figures

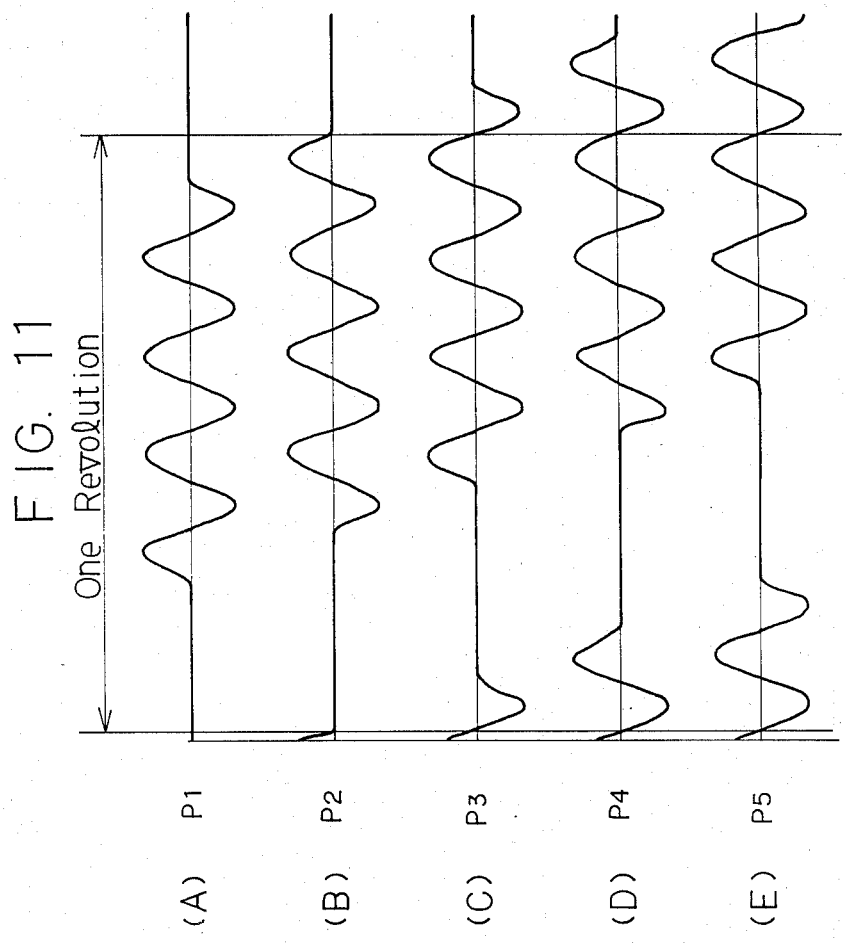

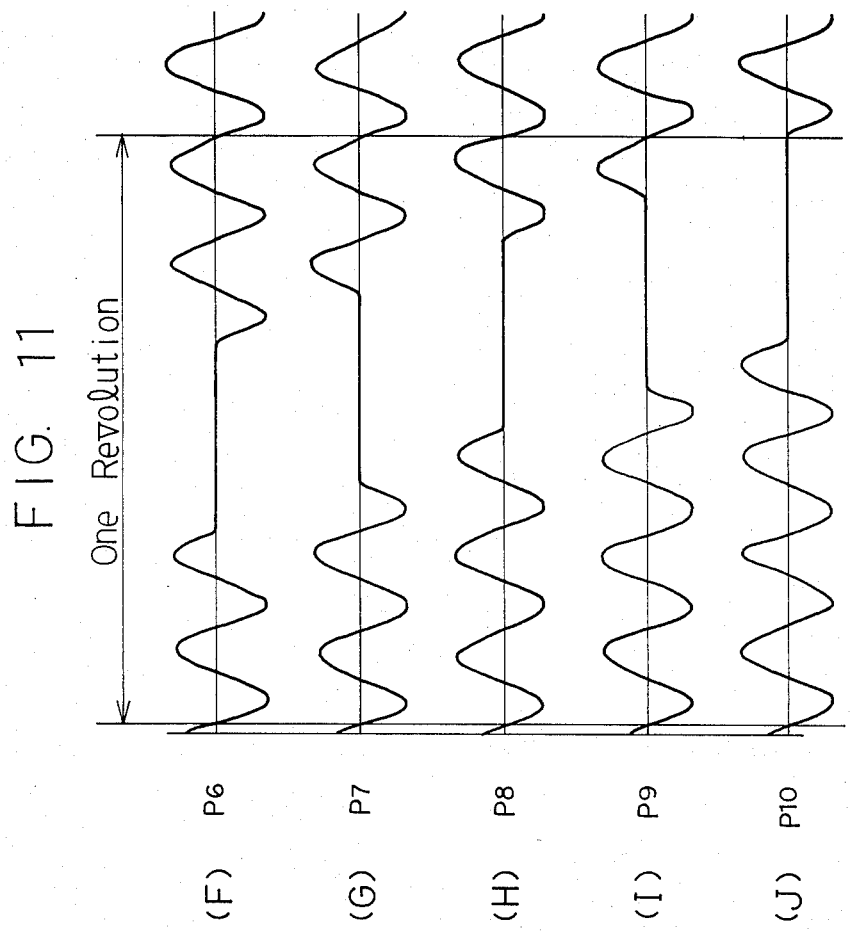

MAGNETO GENERATOR FOR INTERNAL COMBUSTION ENGINE

BACKGROUND OF INVENTION

1. Field of Invention

The present invention relates to a magneto generator for an internal combustion engine, and more particularly to an improved construction of a magneto generator for a motorcycle engine for performing a single spark ignition for one revolution of the generator.

2. Brief Description of Prior Arts

In a generally known magneto generator for a motorcycle, an ignition signal generating assembly is provided independently from a capacitor charging coil and/or lamp coils to perform a single spark ignition for one revolution of the magneto generator.

In another prior art magneto generator, for example, as disclosed in Japanese Examined Patent Publication No. 49-46163, a plurality of radially magnetized magnets are arranged within a flywheel at circumferentially equal intervals, a plurality of radially outwardly extending pole cores equal in number to the magnets face to the magnets, and a pair of series connected windings, constituting an ignition signal coil, are wound in opposite directions on a pair of pole cores having therebetween another pole core, in order to perform a single spark ignition for one revolution of the magneto generator.

In such a magneto generator, however, a pair of series connected windings are necessary to obtain a single ignition signal for every rotation, and the number of magnets and/or pole cores my be generally limited to an odd number, which reduces flexiibility in design.

SUMMARY OF INVENTION

It is, therefore, an object of the present invention to overcome the above drawbacks and to provide a magneto generator for a motorcycle engine, which performs a single spark ignition for each revolution of the magneto generator.

The present invention provides a magneto generator for an internal combustion engine comprising:

a cup-shaped flywheel made of magnetic material and driven by an engine, said flywheel having a circular side wall;

a plurality of magnets fixed to an inner peripheral surface of said side wall and circumferentially arranged at equal intervals, each of said magnets being magnetized in a radial direction and the same polarity appearing at inner peripheral surfaces of a certain number of adjacent magnets while S-pole and N-pole appearing alternately at inner peripheral surfaces of the rest of the magnets; peripheral surfaces of the rest of the magnets;

a stator core arranged within said flywheel and having one radially outwardly extending large pole core and a plurality of radially outwardly extending small pole cores, each pole core being of a T-shape and having at its forward end a circumferentially extending pole piece to face to the inner peripheral surfaces of said magnets, said small pole cores being arranged circumferentially at equal intervals and said large pole core being equally spaced from the adjacent small pole cores, a circumferential width of pole pieces of said small pole cores being smaller than that of each of said magnets while a circumferential width of the pole piece of said large pole core being larger than that of each of said magnets so that said pole piece of said large pole core faces to at least two adjacent magnets at the same time; and a coil wound around said large pole core for producing a single pair of positive and negative halfwave voltages for each revolution of said flywheel.

BRIEF DESCRIPTION OF DRAWINGS

FIG. 2 is an electric wiring diagram showing an ignition system using the magneto generator shown in FIG. 1;

FIG. 11 is a waveform diagram showing waveforms of voltages generated at the respective coils;

DETAILED DESCRIPTION OF PREFERRED EMBODIMENTS

Figure 1:
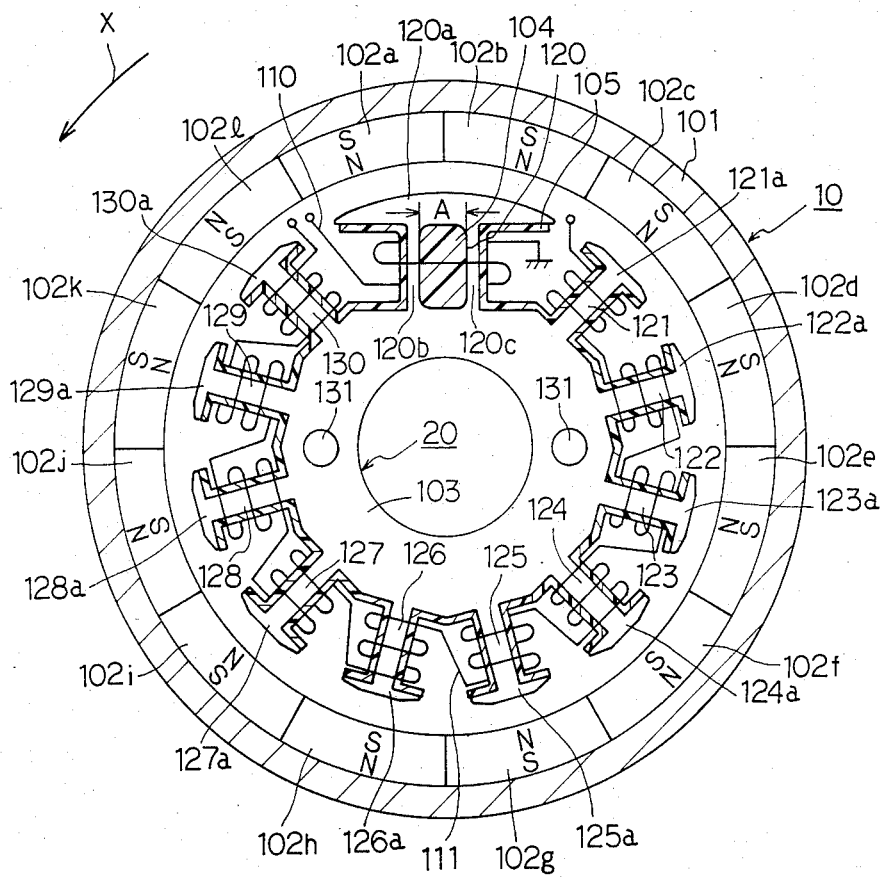

The present invention will now be explained with reference to the embodiments shown in the attached drawings, wherein the same or similar elements or parts are designated by the same reference numerals throughout the whole embodiments.

Figure 2:
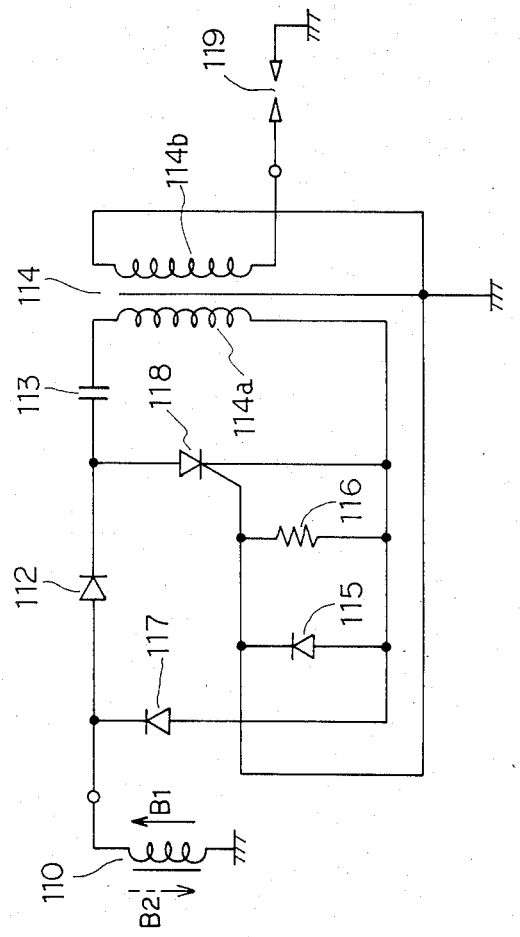
FIG. 2 is a sectional view showing a construction of a magneto generator according to a first embodiment of the present invention.

In FIGS. 1 and 2, showing a first embodiment of the present invention, numeral 10 designates a rotor connected to and driven by a crankshaft (not shown) of a motorcycle engine, being rotated in a direction indicated by an arrow. The rotor comprises a cup-shaped flywheel 101 made of a magnetic material, such as iron and a plurality of (twelve) permanent magnets 102a to 102l fixed to an inner peripheral surface of a circular side wall of the flywheel 101 and circumferentially arranged at equal intervals. Since there are provided 12 magnets in the illustrated embodiment, a pitch angle of each magnet is 30 degrees. Each of the magnets is magnetized in a radial direction and some of them (five magnets 102a to 102e) are so arranged that the same polarity (N-pole) continuously appears at inner peripheral surfaces thereof, while the rest of the magnets (102f to 102l) are arranged in such a manner that both polarities (N-pole and S-pole) appear alternately at the inner peripheral surfaces.

Numeral 20 designates a stator fixed to an engine body by means of screws at bores 131 and arranged within the rotor 10. The stator 20 comprises a plurality of laminated core plates 103 made of a magnetic material, forming a plurality of (eleven) pole cores 120 to 130 extending radially outwardly. Each of the pole cores is of a T-shape and has at its forward end a pole piece (120a to 130a) extending circumferentially, so that the pole pieces face to the inner peripheral surfaces of the magnets 102a to 102l with a small radial air gap. As seen clearly from FIG. 1, the pole cores 121 to 130 except the pole core 120 are arranged circumferentially at equal intervals (a pitch angle is also 30 degrees) and a circumferential width of the pole pieces is smaller than that of the permanent magnets 102a to 102l, that is a pitch angle of each pole piece is about 18 degrees less than the pitch angle 30 degrees of the magnets.

The pole core 120 is different in configuration from the other pole cores and comprises a pair of leg portions 120b and 120c forming a bore 104 filled with an insulating material. A width of each leg portion and a width (A) of the bore 104 are, for example, designed to be 2 mm and 8 mm, respectively, so that a sectional area of the bore 104 is larger than that of the leg portions.

The pole core 120 is spaced from the adjacent pole cores 121 and 130 by an angle of 45 degrees, respectively.

A pole piece 120a formed at the forward end of the pole core 120 has a larger circumferential width than that of the other pole pieces (121a to 130a) and a pitch angle of the pole piece 120a is designed to be 53 degrees so that the pole piece 120a faces to at least two magnets at the same time.

Coil bobbins 105 are formed on the pole cores for the purpose of insulations between the pole cores and coils wound thereon. A thickness of the coil bobbin 105 is, for example, 0.6–1.0 mm.

Numeral 110 designates a capacitor charging coil wound on the pole core 120, while numeral 111 designates a plurality of coils wound on the other pole cores 121 to 130, which are connected in series to a battery and electric loads such as head lamps and so on.

As seen from FIG. 1, each coil 111 is wound in a different direction from the adjacent coils.

In FIG. 2, showing an electric wiring diagram of a capacitor discharge type ignition system using the magneto generator shown in FIG. 1, a capacitor charging circuit is comprised of the coil 110, a diode 112, a capacitor 113, a primary winding 114a of an ignition coil 114, a diode 115 and the earth, so that a positive half wave (shown by an arrow $B_1$) of the generated voltage at the coil 110 flows through the charging circuit in the above order for charging the capacitor 113, while a capacitor discharge circuit is comprised of the capacitor 113, an anode-cathode path of a thyristor 118 and the primary winding 114a. Numeral 116 designates a resistor connected between a gate and the cathode of the thyristor 118 and numeral 117 designates a diode connected between the cathode of the thyristor 118 and the coil 110, so that a negative half wave (shown by an arrow $B_2$) of the generated voltage at the coil 110 flows through a parallel circuit of the resistor 116 and the gate-cathode path of the thyristor 118 and the diode 117 in order to trigger the thyristor 118. Numeral 119 designates a spark plug mounted on the engine and connected to a secondary winding 114b of the ignition coil 114.

An operation of the above-described first embodiment will be explained with reference to FIG. 3.

When the pole piece of the pole core 120 faces to the magnets, at the inner surfaces of which the same polarity is appearing, as shown in FIG. 1, magnetic fluxes flow from the magnets 102a and 102b through the pole core 120 (namely through the leg portions 120b and 120c thereof) and other pole cores 124, 126, 128 and 130 which pole pieces face to those magnets of the different polarity and return to the magnets (102a and 102b) through the magnets (102f, 102h, 102j and 102l) facing to those pole cores and through the flywheel 101. On the other hand, when the pole piece 120a of the pole core 120 face to the magnets having different polarities, no magnetic flux flow through the pole core 120.

A waveform shown in (A) in FIG. 3 shows the magnetic flux change as described above and waveforms in (B) of FIG. 3 show the generated voltages at the coil 110. A positive half wave $B_1$ in (B) of FIG. 3 is generated when the magnetic flux flowing through the leg portions 120b and 120c rapidly increases, while a negative half wave $B_2$ is generated when the magnetic flux is rapidly decreased. As already mentioned, the positive half wave $B_1$ is used to charge the capacitor 113 as indicated by a waveform shown in (C) of FIG. 3 and the negative half wave $B_2$ is used to trigger the thyristor 118 so that a spark ignition takes place. As seen from FIG. 3, since a pair of (positive and negative) half waves are generated once for each revolution, a single ignition spark for one revolution of the magneto generator can be performed.

Figure 3:
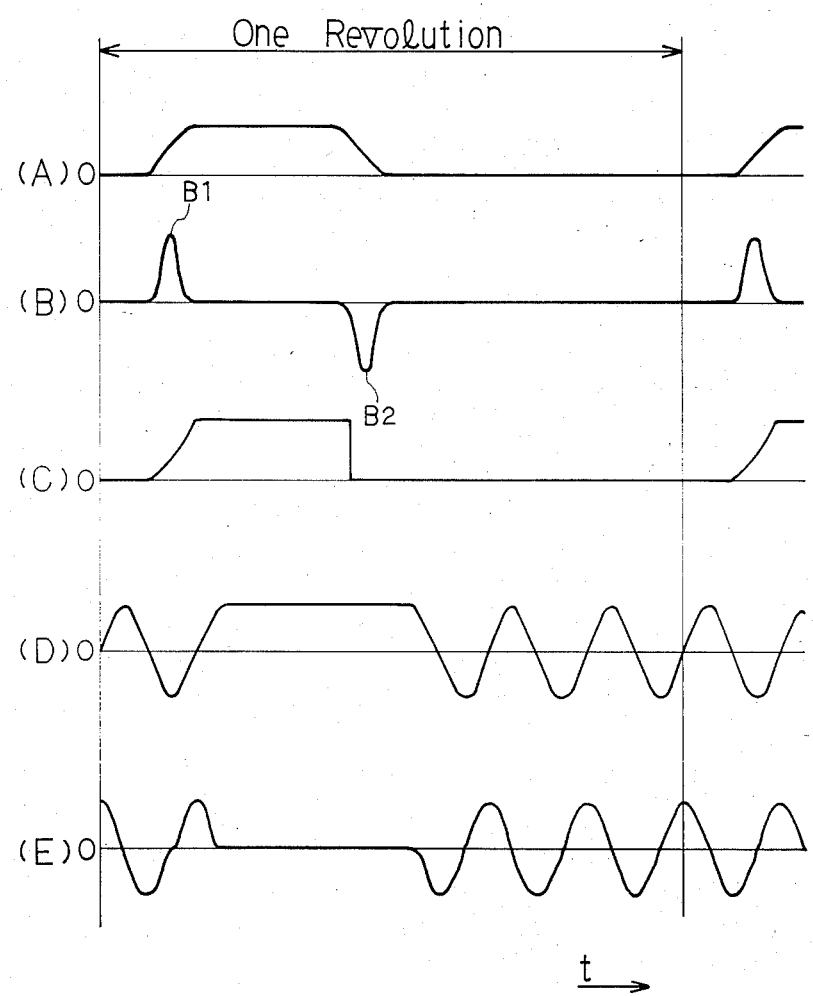
FIG. 3 is a waveform diagram for explaining an operation of the ignition system shown in FIGS. 1 and 2.

In FIG. 3, a waveform of (D) designates a magnetic flux change at the pole core 130 and a waveform of (E) designates a generated voltage at the coil wound thereon caused by the magnetic flux change.

Figure 4:
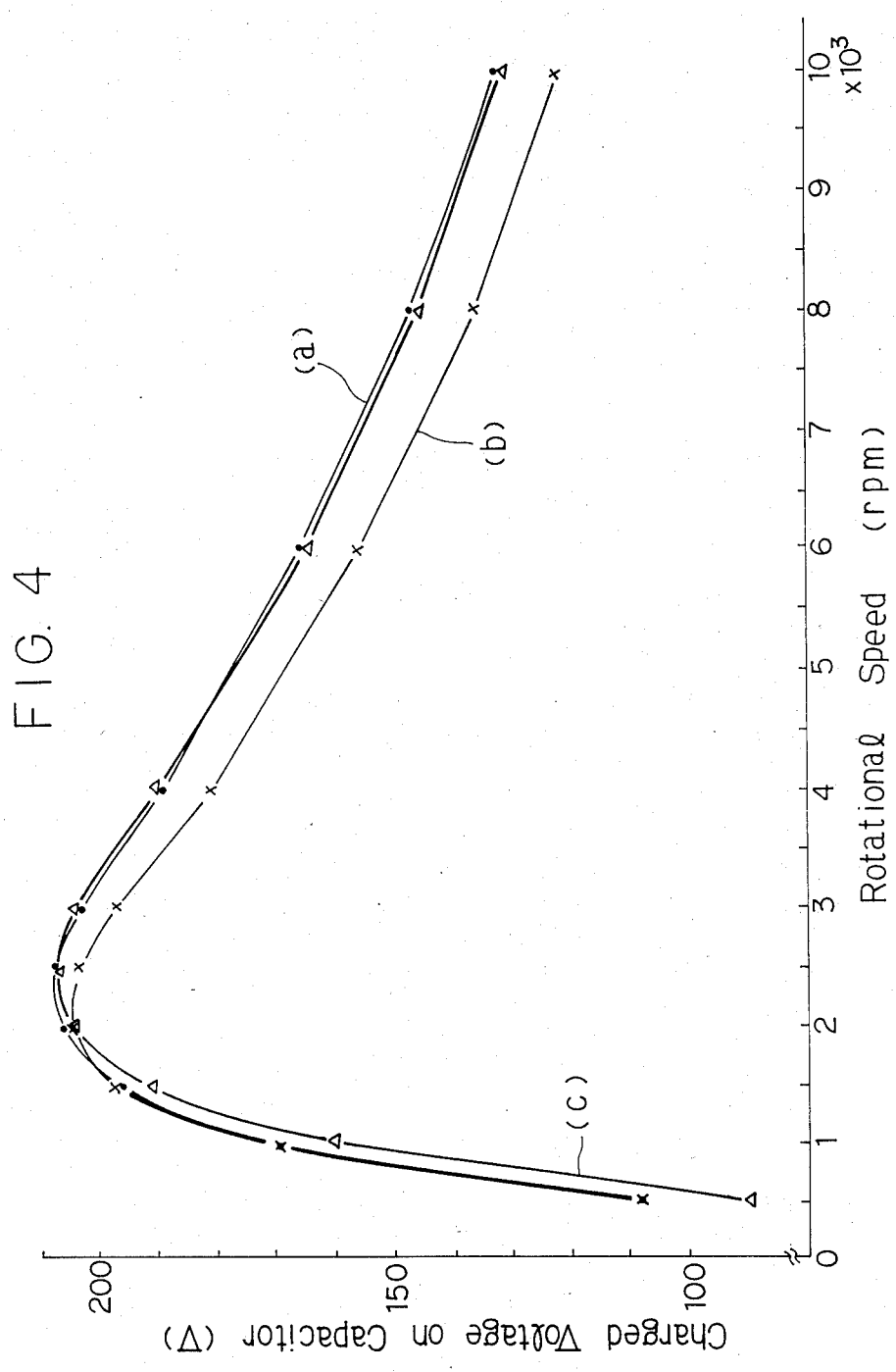
FIG. 4 is a diagram showing characteristic curves of capacitor charging voltages with respect to a rotational speed.

FIG. 4 shows characteristic curves of charged voltages on the capacitor with respect to a number of revolutions of the magneto generator, wherein (a) designates a curve obtained for the above-described embodiment, (b) designates a curve obtained for a magneto generator, wherein the bore 104 is not formed in the pole core 120 and a number of winding turns of the coil 110 is so changed that the charged voltage on the capacitor 113 at 500 rpm corresponds to that of the above embodiment, and (c) designates a curve obtained for a magneto generator, wherein the bore 104 is likewise not formed in the pole core 120 and a number of winding turns of the coil 110 is so changed that the charged voltage on the capacitor 113 at 10,000 rpm corresponds to that of the above embodiment.

When comparing the curve (a) with the curves (b) and (c), it is understood that the sufficient charged voltage is not obtained by the curve (b) at a revolution range higher than 2,000 1 rpm, while the sufficient charged voltage is not obtained by the curve (c) at a revolution range less than 2,000 rpm. Since the bore 104 is formed in the pole core 120 in the above-described embodiment, an impedance (a reactance component) caused by an inductance of the coil 110 can be reduced, so that the sufficient generating voltage for charging the capacitor 113 is obtained over the entire revolution range without increasing the number of winding turns for the coil 110.

A relationship between the pitch angle of the pole piece, on which the charging coil 110 is wound, and the pitch angle of the magnets will be explained with reference to FIGS. 5 to 7.

Figure 5:
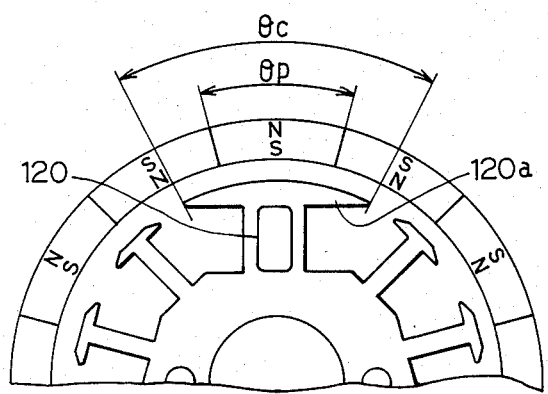
FIG. 5 is a schematic view showing pitch angles of $\theta c$ and $\theta p$.

In FIG. 5, $\theta p$ designates the pitch angle of the magnets and $\theta c$ designates the pitch angle of the pole piece 102a.

Figure 6:
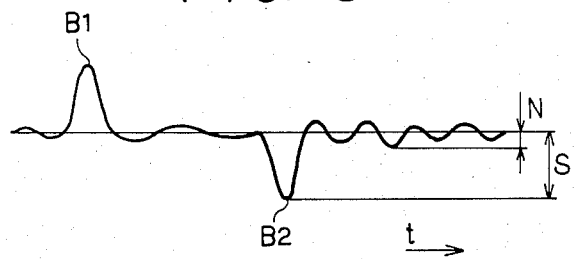
FIG. 6 is a waveform diagram showing a voltage generated at the capacitor charging coil 101.

A waveform shown in FIG. 6 is a generated voltage at the coil 110 and as seen from this figure noise voltage is included therein.

In FIG. 6, S designates a peak value of the negative halfwave $B_2$ used for triggering the thyristor 118 and N designates a peak value of the noise voltage.

Figure 7:
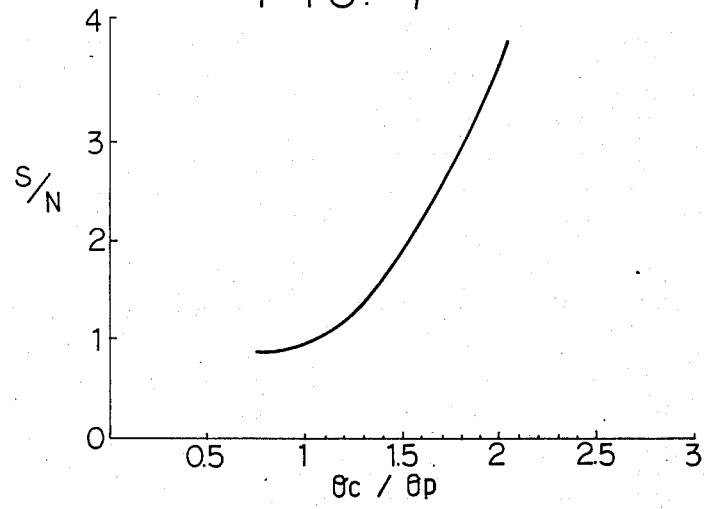
FIG. 7 is a graph showing a characteristic curve of an S/N ratio with respect to $\theta c/\theta p$.

FIG. 7 shows a relationship between an S/N ratio derived from FIG. 6 and an angle, ratio of $\theta c/\theta p$. As seen from FIG. 7, the S/N ratio is increased in response to an increase of the angle ratio of $\theta c/\theta p$ and it was found out that the negative halfwave $B_2$ can be used as a signal for triggering the thyristor when the angle ratio of $\theta c/\theta p$ is greater than 1.5. The most preferable angle ratio $\theta c/\theta p$ is, however, 1.78 when taking a winding operation into consideration.

Figure 8:
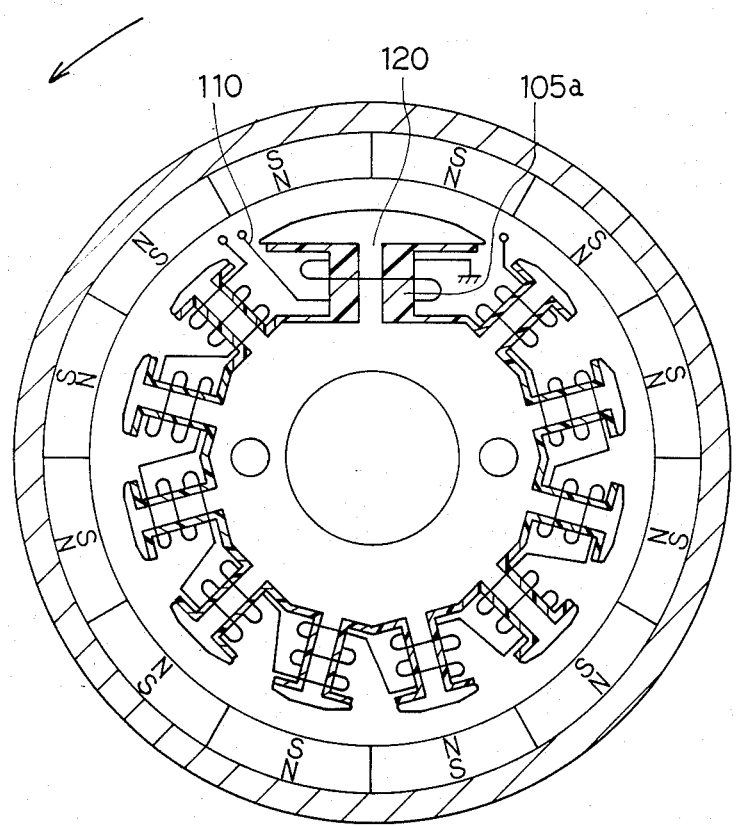
FIG. 8 is a sectional view showing a modified magneto generator.

FIG. 8 shows a modification of the above-described first embodiment of the present invention, which differs from the first embodiment in that, instead of forming the bore 104, a thickness of the coil bobbin 105a around the pole core 120 is made enough large to reduce the impedance caused by the inductance of the coil 110, whereby the same results to the first embodiment can be obtained. The other construction and operation is the same as those of the first embodiment.

Figure 9:
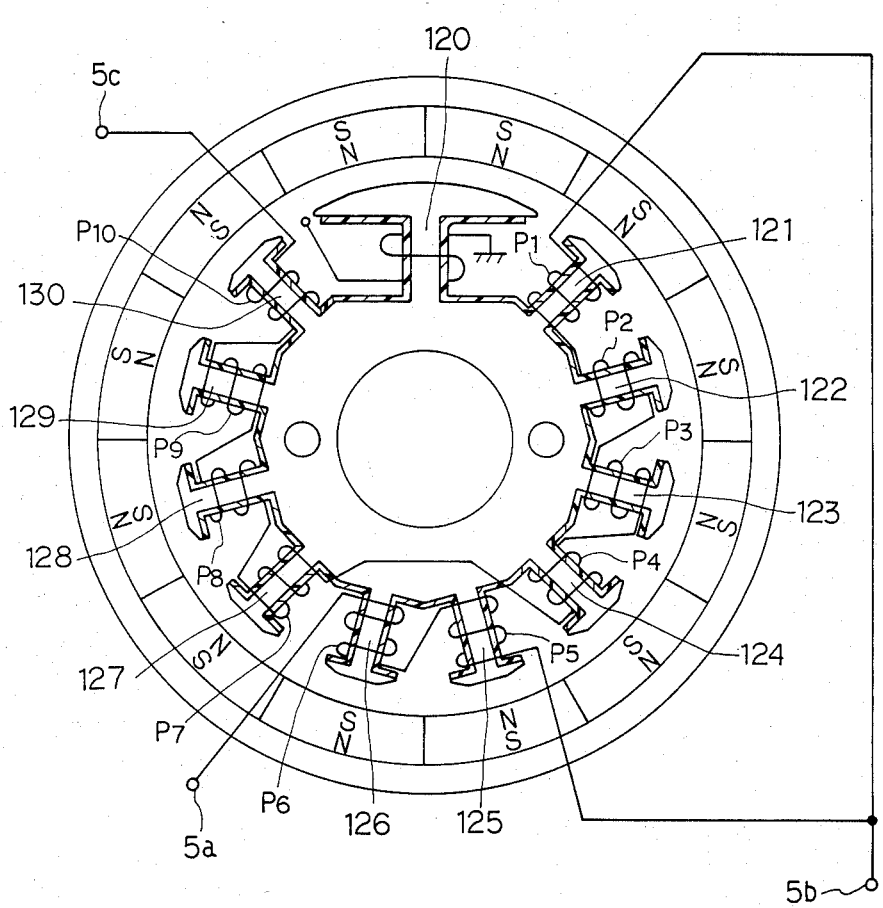
FIG. 9 is a sectional view showing another modified magneto generator.
Figure 10:
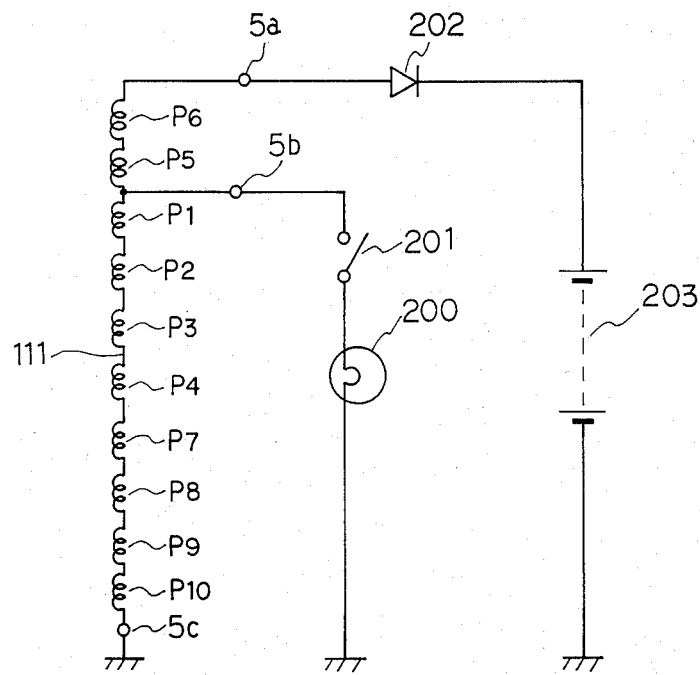
FIG. 10 is an electric wiring diagram showing a lamp lighting and battery charging circuit.

FIG. 9 shows another modification of the above-described first embodiment, which differs from the above-described first embodiment in winding the coils 111. Namely, the coils $P_1$ to $P_4$ continuously wound on the adjacent pole cores 121 to 124 and the coils $P_7$ to $P_{10}$ continuously wound on the adjacent pole cores 127 to 130 are connected in series between a lamp terminal 5b and a ground terminal 5c as shown in FIG. 10, while the coils $P_5$ and $P_6$ wound on the pole cores 125 and 126 are connected in series between a battery terminal 5a and the lamp terminal 5b. In FIG. 10, numeral 200 designates a headlamp, 201 a switch for the headlamp, numeral 202 a diode and numeral 203 a battery.

Figure 12:
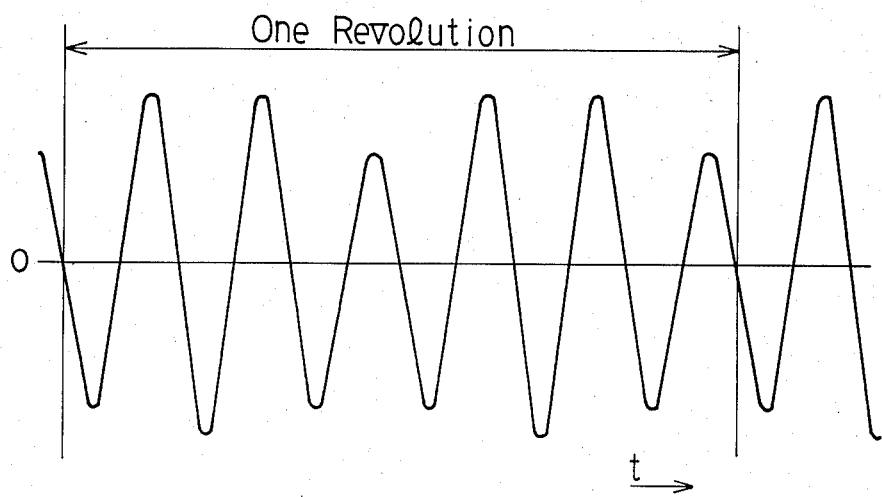
FIG. 12 is a waveform diagram showing a waveform of a composed voltage composing the voltages at the coils P1 to P4 and P7 to P10.
Figure 13:
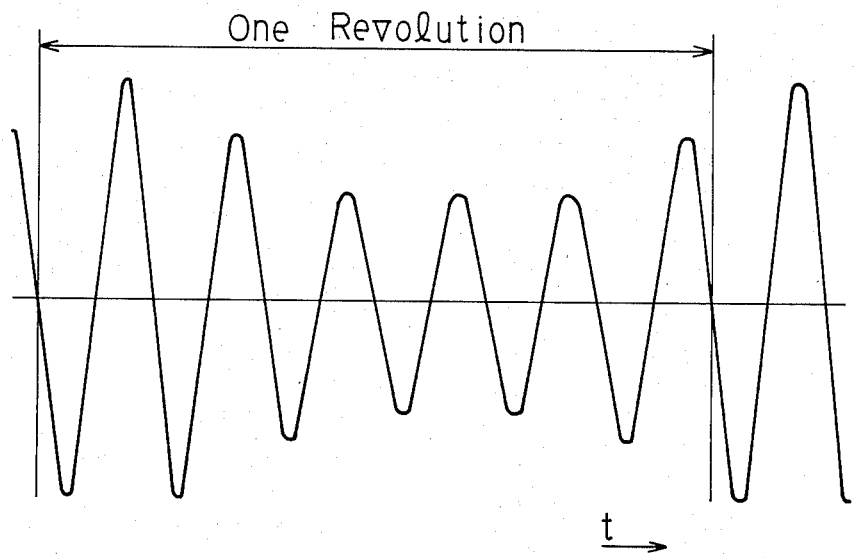
FIG. 13 is a waveform diagram showing a waveform of a composed voltage composing the voltages at the coils P1 to P10.

FIG. 11 shows voltage waveforms generated at the coils $P_1$ to $P_{10}$ and as seen from this figure the voltages of the same waveform are successively generated at the coils $P_1$ to $P_{10}$ with phase difference of 30 degrees. According to the modification shown in FIGS. 9 and 10, the voltages at the coils $P_1$ to $P_4$ and $P_7$ to $P_{10}$ are composed and supplied to the headlamp 200, a waveform of the composed voltage being shown in FIG. 12. For a comparison, a waveform of a composed voltage is shown in FIG. 13, wherein the coil 111 is wound as in the manner shown in FIG. 1 and all of the voltages at the coils $P_1$ to $P_{10}$ are composed. By comparing the waveform of FIG. 12 with that of FIG. 13, it should be understood that:

(1) a frequency of an envelope becomes higher (by twice in this modification) and a flicker of the headlamp can be less caught by eyes of human beings at the same rotational speed, and (2) a degree of a swell of the envelope (a ratio of a maximum wave height to a minimum wave height) can be reduced (the ratio is 1.5 for the modification while the ratio is about 2.0 in case of FIG. 13) so that the rotational speed, at which the flicker of the headlamp is caught by the eyes, can be decreased (a flickering rotational speed of the modification is about 1,300 rpm, while the flickering rotational speed in case of FIG. 13 is 2,700 rpm).

The above-explained modification is only one example of the connecting pattern for the coils $P_1$ to $P_{10}$, and many other connecting patterns are possible to obtain the similar results. The following TABLE shows some samples of the connecting patterns and the corresponding flickering rotational speeds obtained by experiments, from which it should be noted that at least one of coils ($P_2$ to $P_9$), which is not adjacent to the capacitor charging coil 110, should not be used as a coil for the headlamp to decrease the flickering rotational speed.

TABLE

| Sample No. | Coils for battery charging (between terminals 5a and 5c) | Coils for Lamps (between terminals 5b and 5c) | Coils for exclusively charging battery (between terminals 5a and 5b) | Flickering rotational speed |
| --- | --- | --- | --- | --- |
| 1 | $P_1$-$P_{10}$ | $P_1$-$P_{10}$ | | 2700 rpm |
| 2 | $P_1$-$P_{10}$ | $P_2$-$P_{10}$ | $P_1$ | 2600 |
| 3 | ↑ | $P_3$-$P_{10}$ | $P_1$, $P_2$ | 2700 |
| 4 | ↑ | $P_4$-$P_{10}$ | $P_1$, $P_2$, $P_3$ | 2900 |
| 5 | ↑ | $P_1$-$P_5$, $P_7$-$P_{10}$ | $P_6$ | 1900 |
| 6 | ↑ | $P_1$-$P_3$, $P_5$, $P_7$-$P_{10}$ | $P_4$, $P_6$ | 1600 |
| 7 | ↑ | $P_1$-$P_3$, $P_5$, $P_7$, $P_9$, $P_{10}$ | $P_4$, $P_6$, $P_8$ | 1700 |
| 8 | ↑ | $P_1$-$P_3$, $P_5$-$P_{10}$ | $P_4$ | 2100 |
| 9 | ↑ | $P_1$-$P_4$, $P_7$-$P_{10}$ | $P_5$, $P_6$ | 1300 |

Figure 14:
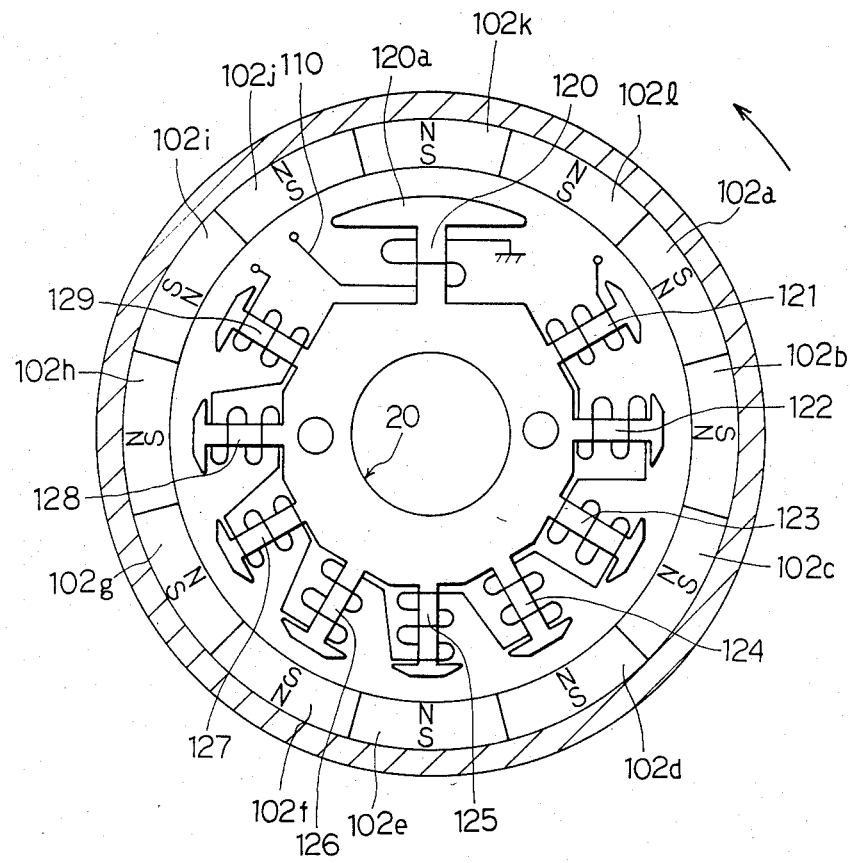
FIG. 14 is a sectional view showing a magneto generator according to a second embodiment of the present invention.
Figure 15:
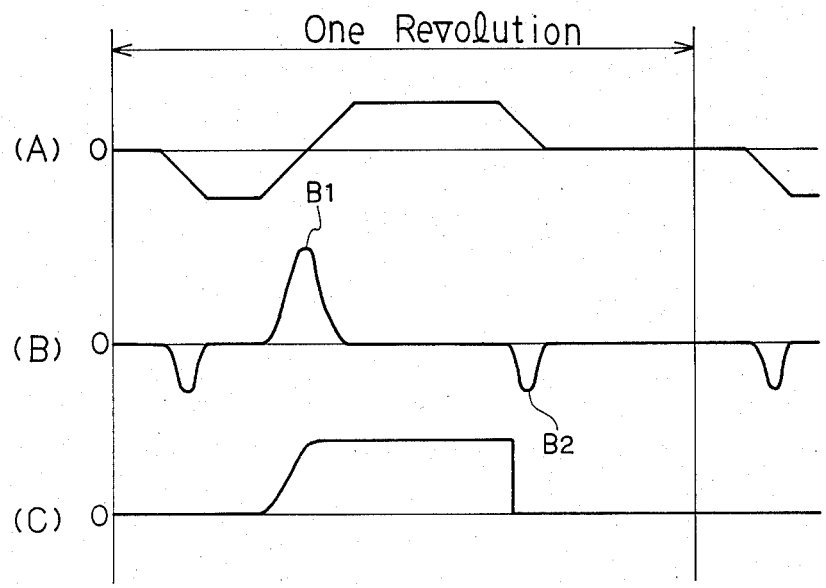
FIG. 15 is a waveform diagram for explaining an operation of the second embodiment.

FIG. 14 shows a second embodiment of the present invention, which differs from the above-described first embodiment in that the stator 20 comprises nine pole cores 121 to 129 circumferentially arranged at equal intervals (30 degrees) and another pole core 120 equally spaced (by an angle of 60 degrees) from the adjacent pole cores 121 and 129, and in that the magnet 102k is magnetized radially in reverse so that the same polarity (S-pole) appears at the inner surfaces of the three magnets 102j, 102k and 102l. The magneto generator shown in FIG. 14 is used for the ignition system shown in FIG. 2 and its operation will be explained with reference to FIG. 15. Since the magnet 102k is modified as above, magnetic fluxes flow through the pole core 120 in both directions as shown in (A) of FIG. 15. Based on these flux changes, a positive ($B_1$) and a negative ($B_2$) half-wave voltages are generated at the charging coil 110, as shown in (B) of FIG. 15. The voltage $B_1$ of the positive halfwave is used to charge the capacitor 113 and the voltage $B_2$ of the negative halfwave is used for triggering the switching thyristor 118 to perform a single spark ignition for each revolution of the magneto generator, as shown in (C) of FIG. 15.

A relationship between the pitch angle of the pole piece 120 and the pitch angle of the magnets was likewise investigated by the inventor.

Figure 16:
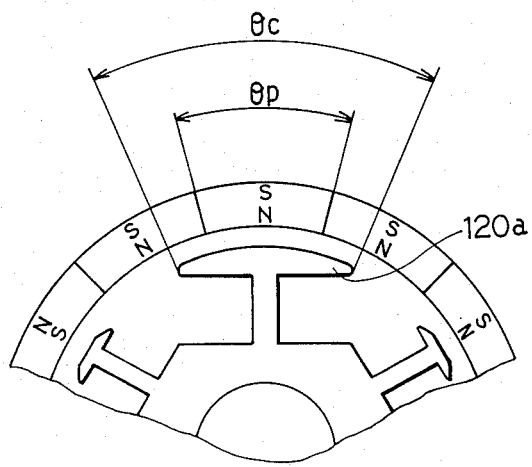
FIG. 16 is a schematic view showing pitch angles of $\theta c$ and $\theta p$ of the second embodiment.

In FIG. 16, $\theta p$ designates the pitch angle of each magnet and $\theta c$ designates the pitch angle of the pole piece 120a.

Figure 17:
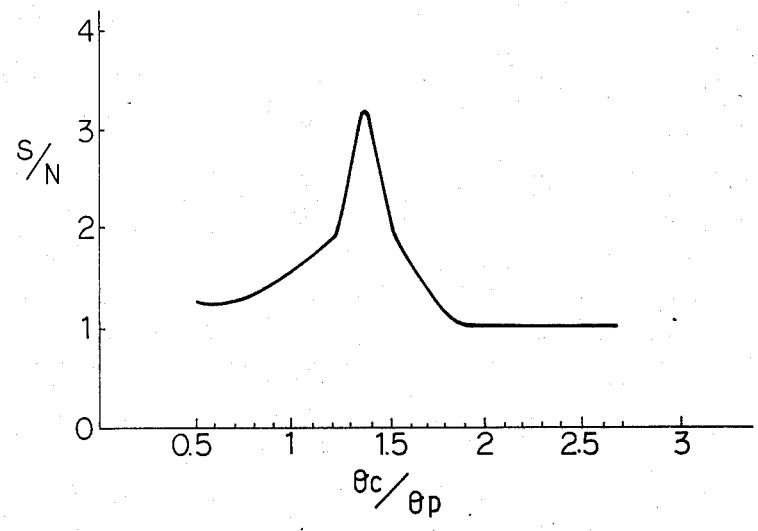
FIG. 17 is a graph showing a characteristic curve of an S/N ratio with respect to $\theta c/\theta p$.

In FIG. 17, showing a relationship between an S/N ratio and an angle ratio of $\theta c/\theta p$, it is seen that the S/N ratio is maximum at the angle ratio of 1.37 and a preferable range of the angle ratio is between 1.3 and 1.7.

Figure 19:
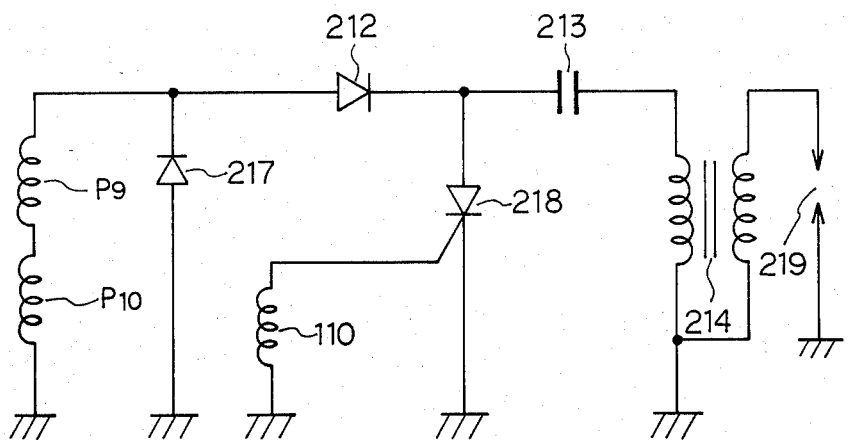
FIG. 19 is an electric wiring diagram showing an ignition system using the magneto generator shown in FIG. 18.
Figure 18:
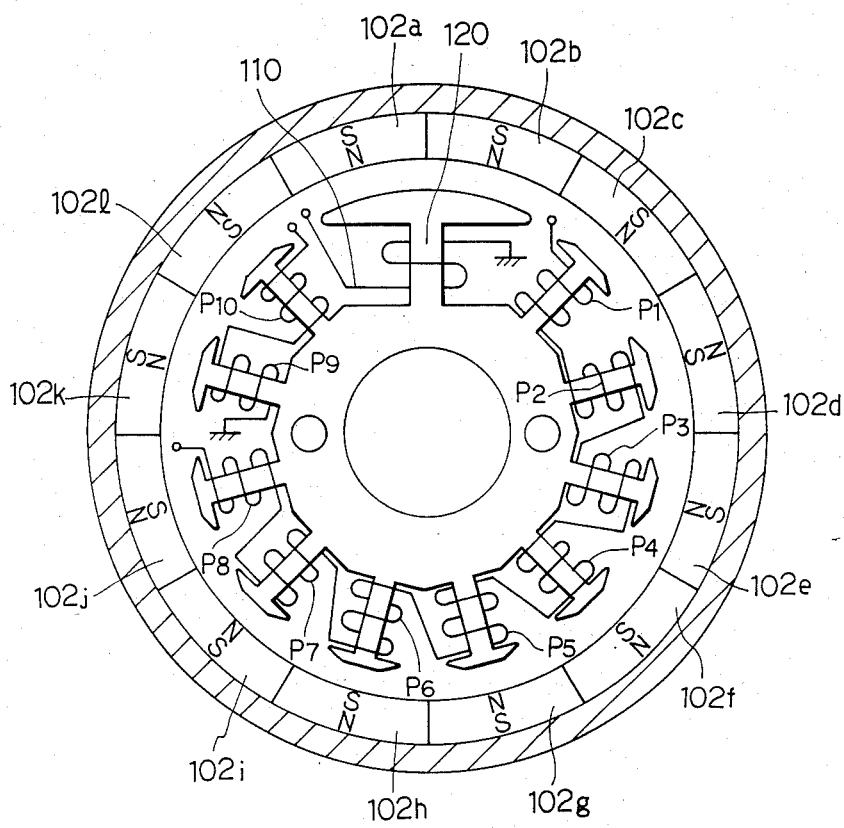
FIG. 18 is a sectional view showing a magneto generator according to a third embodiment.

FIG. 18 shows a third embodiment of the present invention, wherein three magnets 102a to 102c are so magnetized that the same polarity (N-pole) appears at the inner surfaces thereof and other magnets 102d to 102l are so magnetized that S-pole and N-pole appear alternately. The coils $P_9$ and $P_{10}$ are electrically separated from the other coils $P_1$ to $P_8$ and used as capacitor charging coils. On the other hand, the coil 110 wound on the pole core 120 is used as a signal coil for triggering a switching element. An ignition system, in which the magneto generator of FIG. 18 is used, is shown in FIG. 19, wherein a capacitor charging circuit is comprised of the coils $P_9$ and $P_{10}$, a diode 212, a capacitor 213 and a primary winding of the ignition coil 214, while a capacitor discharge circuit is comprised of the capacitor 213, a thyristor 218 and the primary winding. The coil 110 is connected to a gate of the thyristor 218. In FIG. 19, numeral 217 designates a diode connected across the capacitor charging coils $P_9$ and $P_{10}$, and numeral 219 designates a spark plug. Since a triggering voltage is produced at the coil 110 once for each revolution of the magneto generator, a single spark ignition for each revolution is performed.

Figure 20:
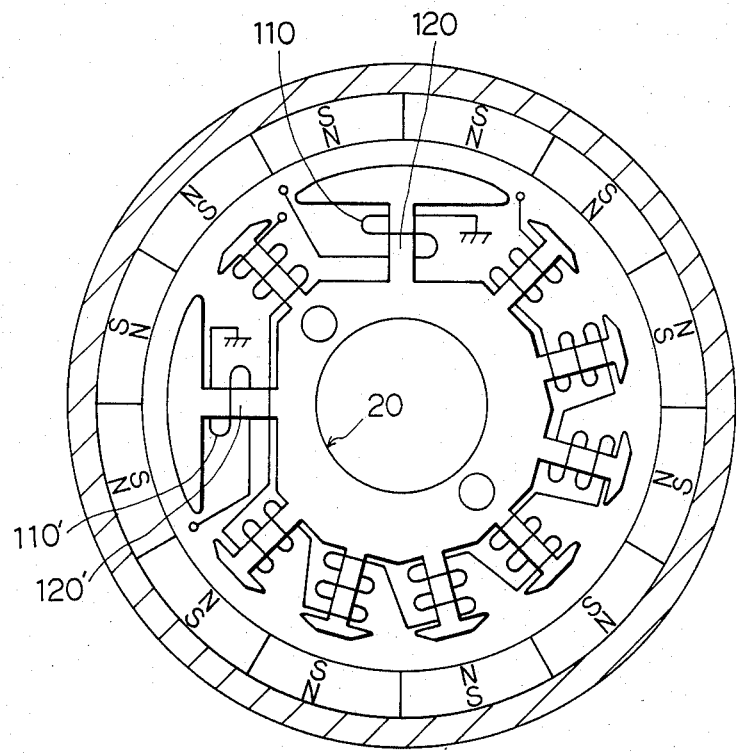
FIG. 20 is a sectional view showing a magneto generator according to a fourth embodiment.

FIG. 20 shows a fourth embodiment of the present invention, which can be used for a two-cylinder engine. For its purpose, another pole core 120' which is the same in its construction to the pole core 120, is formed in the stator 20 in place of the pole cores 128 and 129 when compared with the stator of FIG. 1. A coil 110' wound on the pole core 120' is used in an ignition system, which is the same to that shown in FIG. 2, for the second cylinder.

Figure 21:
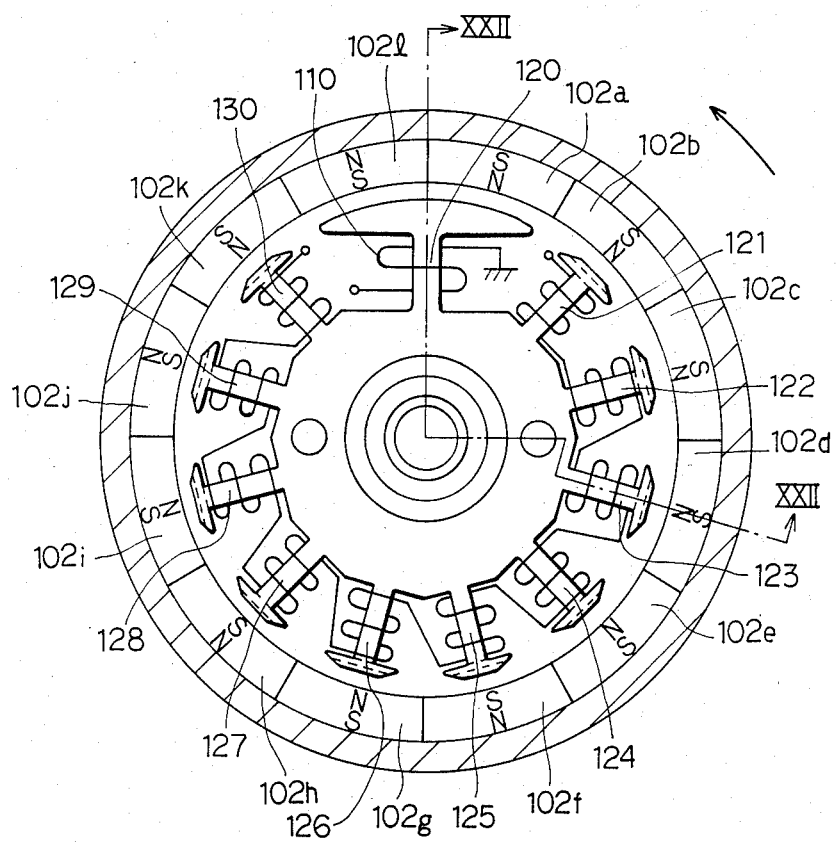
FIG. 21 is a sectional view showing a magneto generator according to a fifth embodiment.
Figure 22:
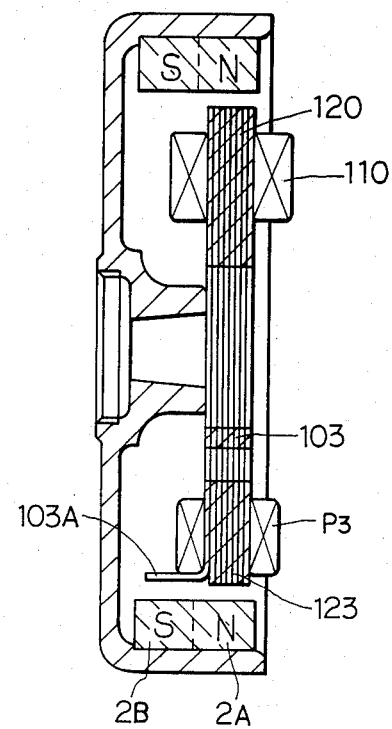
FIG. 22 is a sectional view taken along a line XXII—XXII in FIG. 21.
Figure 23:
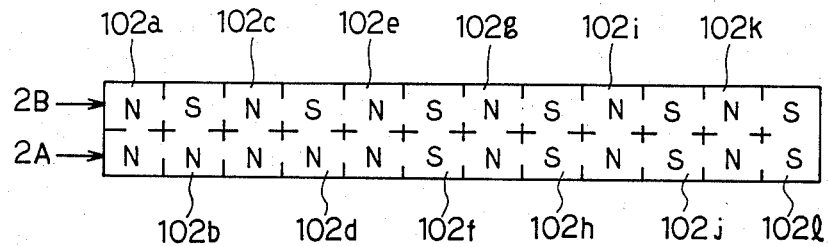
FIG. 23 is a development view showing inner surfaces of magnets.

In FIGS. 21 to 23, showing a fifth embodiment of the present invention, each magnet (102a to 102l) is axially divided into two pieces as best shown in FIG. 22, the magnets in the first circumferential row 2A are radially magnetized in the same manner as those in the first embodiment shown in FIG. 1, and the magnets in the second circumferential row 2B are radially magnetized so that N-pole and S-pole appear alternately, as best shown in FIG. 23.

A thickness of the laminated core plates 103 is so designed to be a little smaller than an axial width of the magnets in the first line 2A, so that the circumferential outer surfaces of the pole cores face to the inner surfaces of the magnets in the first line 2A.

An innermost core plate 103A is so shaped that a forward end of each pole core (121 to 130) except for the pole core 120 is bent in an axial direction and each bent end faces to magnets in the second row 2B. The other construction of this fifth embodiment is substantially the same as that of the first embodiment.

Figure 24:
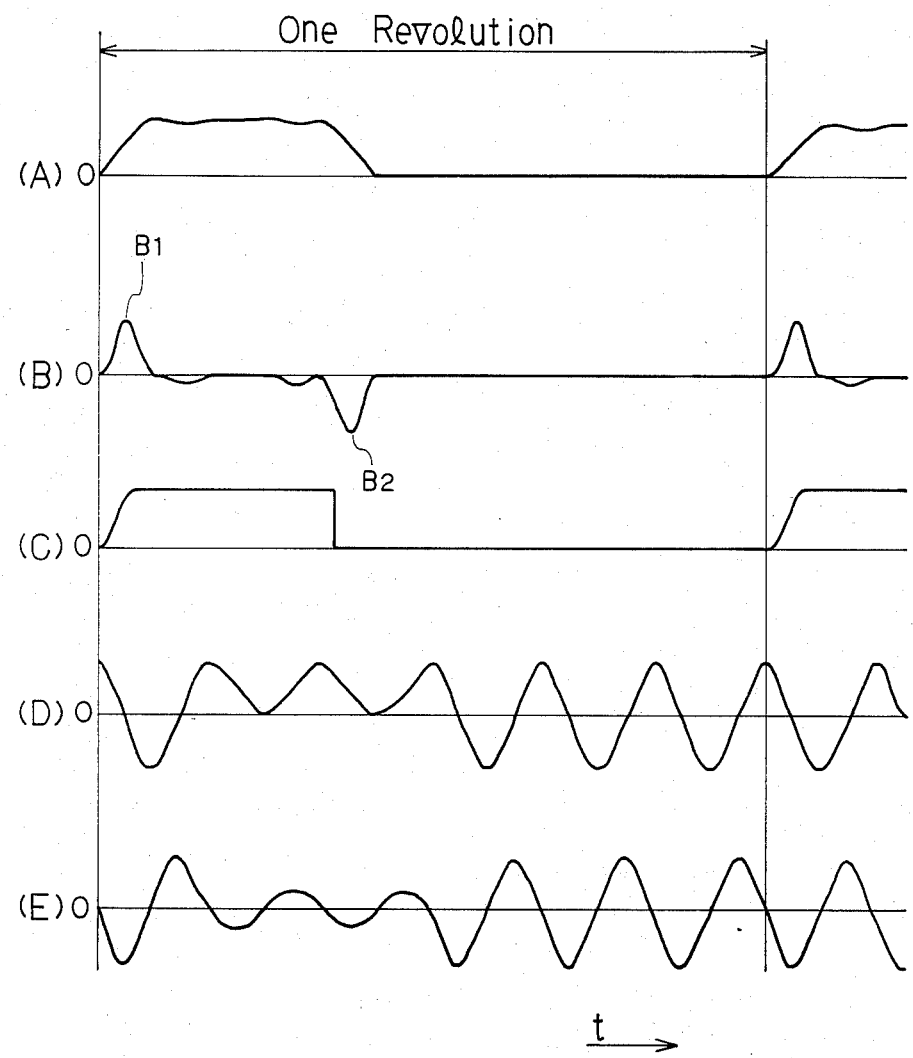
FIG. 24 is a waveform diagram for explaining an operation of the fifth embodiment shown in FIGS. 21 to 23.

The magneto generator shown in FIGS. 21 to 23 can be used in the ignition system shown in FIG. 2 and as seen from (A) to (C) of FIG. 24 the ignition operation is substantially the same as that of the first embodiment.

In FIG. 24, a waveform of (A) shows the magnetic flux change taking place in the pole core 120, waveforms $B_1$ and $B_2$ in (B) show the generated voltages at the coil 110 caused by the magnetic flux change, and a waveform shown in (C) illustrates a charge on the capacitor 113, so that a single ignition spark takes place for each revolution of the magneto generator.

A waveform shown in (D) of FIG. 24 illustrates magnetic flux change taking place in one of the pole cores 121 to 130 and a waveform shown in (E) of FIG. 24 illustrates a generated alternating voltage at the coil wound on the corresponding pole core caused by the magnetic flux change in (D).

By comparing the waveform shown in (E) of FIG. 24 with the waveform shown in (E) of FIG. 3, it can be understood that each coil $P_1$ to $P_{10}$ wound on the pole cores 121 to 130 can continuously produce the alternating voltage even when those pole cores face to the magnets 102a to 102e, whereby the output voltage derived from the coils $P_1$ to $P_{10}$ can be increased in comparison with the first embodiment.

Figure 25:
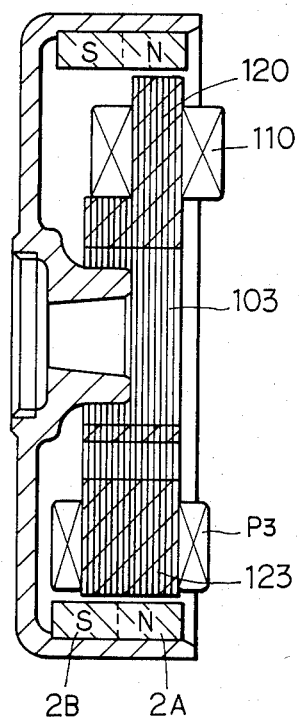
FIG. 25 is a sectional view showing a modified magneto generator, which is a modification of the fifth embodiment.

FIG. 25 shows a modification of the fifth embodiment, which differs from the magneto generator shown in FIGS. 21 to 23 in that instead of bending the forward ends of the innermost core plate a thickness of the laminated core plates except for the pole core 120 is made larger so that the circumferential outer surfaces of the laminated core plates face to the magnets in both rows 2A and 2B.

Although the invention was described with reference to the specific embodiments, it is apparent that any further modifications can be easily done by a person skilled in the art without departing from a spirit and scope of the invention which are defined in the appended claims.

What is claimed is:

1. A magneto generator for an internal combustion engine comprising;

a cup-shaped flywheel made of magnetic material and driven by an engine, said flywheel having a circular side wall;

a plurality of magnets fixed to an inner peripheral surface of said circular side wall and circumferentially arranged at equal intervals, each of said magnets being magnetized in a radial direction and the same polarity appearing at one portion of inner peripheral surfaces of said circumferentially arranged magnets so that at least two magnets having the same polarity are arranged adjacently, while S-pole and N-pole appear alternately at the remaining portion of inner peripheral surfaces of said circumferentially arranged magnets;

a stator core arranged within said flywheel and having at least one radially outwardly extending large pole core and a plurality of radially outwardly extending small pole cores, each pole core being a T-shape and having at its forward end a circumferentially extending pole piece to face to the inner peripheral surfaces of said magnets, said small pole cores being arranged circumferentially at equal intervals and said at least one large pole core being equally spaced from the adjacent small pole cores, a circumferential width of pole pieces of said small pole cores being smaller than that of each of said magnets while a circumferential width of the pole pieces of said at least one large pole core being larger than that of each of said magnets so that said pole piece of said at least one large pole core faces to at least two adjacent magnets at the same time; and a coil wound around said at least one large pole core for producing a single pair of positive and negative halfwave voltages for each revolution of said flywheel.

2. A magneto generator as set forth in claim 1, wherein said at least one large pole core comprises a pair of leg portions extending radially outwardly and terminating at the pole piece of said at least one large pole core for forming a bore therein.

3. A magneto generator as set forth in claim 2, wherein a cross-sectional area of said bore is larger than that of said leg portions.

4. A magneto generator as set forth in claim 1, further comprising
an insulating layer surrounding said at least one large pole core on which said coil is wound, said insulating layer having a sufficient thickness so that a cross-sectional area of said insulating layer is larger than that of said at least one larger pole core.

5. A magneto generator as set forth in claim 1, wherein said plurality of magnets are comprised of twelve magnets, five adjacent magnets of which are so arranged that the same polarity appears at their inner peripheral surfaces.

6. A magneto generator as set forth in claim 1, wherein
said plurality of magnets are comprised of twelve magnets,
said stator core comprises said at least one large pole core and ten small pole cores, said small pole cores being arranged at an internal of 30 degrees while said at least one large pole core being spaced from the adjacent small pole cores by 45 degrees, and
an angle ratio of $\theta c/\theta p$ is preferably in a range between 1.5 and 1.78, wherein $\theta c$ is a pitch angle of the pole piece of at least one said large pole core and $\theta p$ is a pitch angle of said magnets.

7. A magneto generator as set forth in claim 1, further comprising:
a plurality of first to N-th coils respectively wound on said small pole cores and arranged in this order, wherein N corresponds to a number of said small cores, and
said coils except for M-th coil is connected in series to a headlamp, wherein M is larger than one and less than N.

8. A magneto generator as set forth in claim 6, further comprising:
first to tenth coils respectively wound on said small pole cores and arranged in this order, wherein said first to fourth coils and seventh to tenth coils are connected in series to a headlamp.

9. A magneto generator for an internal combustion engine comprising;
a cup-shaped flywheel made of magnetic material and driven by an engine, said flywheel having a circular side wall;
a plurality of magnets fixed to an inner peripheral surface of said side wall and circumferentially arranged at equal intervals, each of said magnets being magnetized in a radial direction and the same polarity appearing at inner peripheral surfaces of a certain number of adjacent magnets while N-pole and S-pole alternately appearing at inner peripheral surfaces of the remaining magnets;
a stator core arranged within said flywheel and having one large pole core and a plurality of first to Nth small pole cores, each pole core extending radially outwardly and having at its forward end a pole piece circumferentially extending to face to the inner peripheral surfaces of said magnets, said small pole cores being arranged circumferentially at equal intervals and said large pole core being equally spaced from the adjacent first and N-th small pole cores, a pitch angle of said small pole cores being made equal to that of said magnets, a pitch angle of each pole piece of said small pole cores being smaller than that of said magnets while a pitch angle of the pole piece of said large pole core being larger than that of said magnets so that said pole piece of said large pole core faces to at least two adjacent magnets at the same time;
a plurality of first to N-th coils respectively wound on said small pole cores and arranged in this order, said coils except for M-th coil being connected in series to a headlamp, wherein M is larger than one and less than N.

10. A magneto generator for an internal combustion engine comprising;
a cup-shaped flywheel made of magnetic material and driven by an engine, said flywheel having a circular side wall;
twelve magnets fixed to an inner peripheral surface of said side wall and circumferentially arranged at equal intervals of 30 degrees, each of said magnets being so magnetized in a radial direction that one of N-pole and S-pole appears at the inner peripheral surfaces of the first to third magnets, the other pole appears at the inner peripheral surfaces of the fourth to eighth magnets and N-pole and S-pole appear alternately at the inner peripheral surfaces of the rest of the magnets;
a stator core arranged within said flywheel and having one large pole core and nine small pole cores, each pole core extending radially outwardly and having at its forward end a pole piece circumferentially extending to face to the inner peripheral surfaces of said magnets, said small pole cores being arranged circumferentially at equal intervals of 30 degrees and said large pole being equally spaced from the adjacent small pole cores by 60 degrees, a pitch angle of each pole piece of said small pole cores being smaller than that of the magnet while a pitch angle of the pole piece of said large pole core being larger than that of said magnet so that said pole piece of said large pole core faces to at least two adjacent magnets at the same time; and a coil wound around said large pole core for producing a single halfwave voltage in one direction and a pair of halfwave voltages in the opposite direction for each revolution of said flywheel.

11. A magneto generator as set forth in claim 10, an angle ratio of $\theta c/\theta p$ is preperably in a range between 1.3 and 1.7, wherein $\theta c$ is a pitch angle of the pole piece of said large pole core and $\theta p$ is a pitch angle of said magnets.

12. A magneto generator for an internal combustion engine comprising:
a cup-shaped flywheel made of magnetic material and driven by an engine, said flywheel having a circular side wall;
a plurality of magnets fixed to an inner peripheral surface of said side wall and circumferentially arranged at equal intervals, each of said magnets being magnetized in a radial direction and the same polarity appearing at inner peripheral surfaces of a certain number of adjacent magnets while N-pole and S-pole alternately appearing at inner peripheral surfaces of the remaining magnets;
a stator core arranged within said flywheel and having one radially outwardly extending large pole core and a plurality of radially outwardly extending small pole cores, each of said pole cores being of a T-shape and having at its forward end a circumferentially extending pole piece to face to the inner peripheral surfaces of said magnets, said small pole cores being arranged circumferentially at equal intervals and said large pole core being equally spaced from the adjacent small pole cores, a circumferential width of pole pieces of said small pole cores being smaller than that of said magnets while a circumferential width of the pole piece of said large pole core being larger than that of said magnets so that said pole piece of said large pole core faces to at least two adjacent magnets at the same time;
a capacitor charging coil wound on at least one of said small pole cores; and
a signal coil wound on said large pole core for producing a single triggering signal for each revolution of said flywheel.

13. A magneto generator for an internal combustion engine comprising:
a cup-shaped flywheel made of magnetic material and driven by an engine, said flywheel having a circular side wall;
a plurality of magnets fixed to an inner peripheral surface of said side wall and circumferentially arranged at equal intervals, each of said magnets being magnetized in a radial direction and the same polarity appearing at inner peripheral surfaces of a certain number of adjacent magnets while N-pole and S-pole alternately appearing at inner peripheral surfaces of the remaining magnets;
a stator core arranged within said flywheel and having two radially outwardly extending large pole cores and a plurality of radially outwardly extending small pole cores, each of said pole cores being of a T-shape and having at its forward end a circumferentially extending pole piece to face to the inner peripheral surfaces of said magnets, one of said small pole core being formed between said large pole cores and remaining small pole cores being arranged circumferentially at equal intervals and said large pole cores being respectively equally spaced from the adjacent small pole cores, a circumferential width of pole pieces of said small pole cores being smaller than that of said magnets while a circumferential width of the pole pieces of said large pole cores being larger than that of said magnets so that said pole pieces of said large pole cores faces to at least two adjacent magnets at the same time; and
coils respectively wound on said large pole cores for respectively producing a single pair of positive and negative halfwave voltages for each revolution of said flywheel.

14. A magneto generator for an internal combustion engine comprising:
a cup-shaped flywheel made of magnetic material and driven by an engine, said flywheel having a circular side wall;
a first and a second rows of magnets, each including a plurality of magnets fixed to an inner peripheral surface of said side wall and circumferentially arranged at equal intervals, each of said magnets in said first row being magnetized in a radial direction and the same polarity appearing at inner peripheral surfaces of a certain number of adjacent magnets while N-pole and S-pole alternately appearing at inner peripheral surfaces of the remaining magnets, the magnets in said second row being so magnetized in a radial direction that N-pole and S-pole appear alternately at their inner peripheral surfaces;
a stator core arranged within said flywheel and having one radially outwardly extending large pole core and a plurality of radially outwardly extending small pole cores, each of said pole cores being of a T-shape and having at its forward end a circumferentially extending pole piece,
the pole piece of said large pole core being arranged to face to the inner peripheral surfaces of said magnets in said first row, while the pole pieces of said small pole cores being arranged to face to the inner peripheral surfaces of said magnets in said first and second rows, said small pole cores being arranged circumferentially at equal intervals and said large pole core being equally spaced from the adjacent small pole cores, a circumferential width of pole pieces of said small pole cores being smaller than that of said magnets while a circumferential width of the pole piece of said large pole core being larger than that of said magnets so that said pole piece of said large pole core faces to at least two adjacent magnets at the same time; and
a coil wound on said large pole core for producing a single pair of positive and negative halfwave voltages for each revolution of said flywheel.

15. A magneto generator for an internal combustion engine comprising;
a cup-shaped flywheel made of magnetic material and driven by an engine, said flywheel having a circular side wall;
a plurality of magnets fixed to an inner peripheral surface of said circular side wall and circumferentially arranged at equal intervals, each of said magnets being magnetized in a radial direction and the same polarity appearing at one portion of inner peripheral surfaces of said circumferentially arranged magnets so that at least two magnets having the same polarity are arranged adjacently, while S-poles and N-poles appear alternately at the remaining portion of inner peripheral surfaces of said circumferentially arranged magnets;

a stator core arranged within said flywheel and having at least one radially outwardly extending large pole core and a plurality of radially outwardly extending small pole cores, each pole core being of a T-shape and having at its forward end a circumferentially extending pole piece to face to the inner peripheral surfaces of said magnets, said small pole cores being arranged circumferentially at equal intervals and said at least one large pole core being equally spaced from the adjacent small pole cores, a circumferential width of pole pieces of said small pole cores being any one of equal to or smaller than that of each of said magnets while a circumferential width of the pole pieces of said at least one large pole core being larger than that of each of said magnets so that said pole piece of said at least one large pole core faces to at least two adjacent magnets at the same time; and a spark ignition means including a coil wound around said at least one large pole core for producing a spark ignition signal for each revolution of said flywheel.

* * * * *